United States Patent [19]

Jin

[11] 4,129,710

[45] Dec. 12, 1978

[54] FIRE RETARDANT COPOLYMER OF TRIALLYL PHOSPHATE AND A BIS (HYDROCARBYL) VINYLPHOSPHONATE

[75] Inventor: Jung I. Jin, Irvington, N.Y.

[73] Assignee: Stauffer Chemical Company, Westport, Conn.

[21] Appl. No.: 748,071

[22] Filed: Dec. 6, 1976

Related U.S. Application Data

[63] Continuation of Ser. No. 496,233, Aug. 9, 1974, abandoned.

[51] Int. Cl.² .................. C08F 36/20; C08F 36/22; C08F 236/20
[52] U.S. Cl. ..................... 526/278; 521/137; 526/275
[58] Field of Search ................ 526/275, 278

[56] References Cited

U.S. PATENT DOCUMENTS

| | | | |
|---|---|---|---|
| 3,208,943 | 9/1965 | Kirby | 252/49.8 |
| 3,243,417 | 3/1966 | Kirby | 526/278 |
| 3,726,839 | 4/1973 | Jin | 526/278 |
| 3,842,048 | 10/1974 | Jin | 526/278 |

Primary Examiner—C. Warren Ivy
Attorney, Agent, or Firm—Richard P. Fennelly

[57] ABSTRACT

A fire retardant additive for a polyurethane foam comprising a copolymer of:

(1) an allyl group containing compound having the formula $(CH_2=CHCH_2O)_2P(O)A$, where A is either OR or R, R being a vinyl group, an allyl group, a $C_1$-$C_{10}$ alkyl group or an aryl group;

(2) at least one bis(hydrocarbyl)vinylphosphonate having the structure:

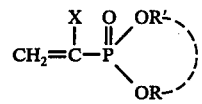

wherein X is selected from the group consisting of hydrogen, halogen, cyano, aryl, $C_1$-$C_{18}$ alkyl, and

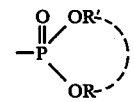

wherein R and R' are hydrocarbyl and substituted hydrocarbyl groups which can be the same, different or conjoint; and (3) at least one optional third comonomer selected from the group consisting of the vinyl and vinylidene halides, the alpha olefins, vinyl esters of carboxylic acids, $C_1$-$C_{20}$ alkyl esters of acrylic and methacrylic acid, ethylenically unsaturated dicarboxylic acids, the corresponding anhydrides thereof and the $C_1$-$C_{20}$ mono and dialkyl esters thereof, amides of ethylenically unsaturated carboxylic acids and the N-methylol and diacetone derivatives thereof, vinyl aryl compounds, $C_1$-$C_{20}$ alkyl vinyl ethers, aliphatic dienes and glycidyl esters of acrylic and methacrylic acid.

When these copolymers are added to a polyurethane foam formulation at about 20-30 parts per hundred based upon the weight of polyol, a flame retardant polyurethane foam having good physical properties results therefrom.

8 Claims, No Drawings

FIRE RETARDANT COPOLYMER OF TRIALLYL PHOSPHATE AND A BIS (HYDROCARBYL) VINYLPHOSPHONATE

This is a continuation of application Ser. No. 496,233 filed Aug. 9, 1974, now abandoned.

TECHNICAL DESCRIPTION OF THE INVENTION

This invention relates to copolymers which when incorporated in a polyurethane foam formulation confer flame retardancy on the foam that results therefrom. The copolymers comprise:

(1) an allyl group containing compounds having the formula $(CH_2=CHCH_2O)_2P(O)A$, where A is either OR or R, R being a vinyl group, an allyl group, a $C_1$–$C_{10}$ alkyl group or an aryl group;

(2) at least one bis(hydrocarbyl)vinylphosphonate having the structure:

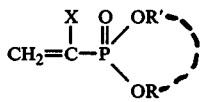

wherein X is selected from the group consisting of hydrogen, halogen, cyano, aryl such as phenyl, $C_1$–$C_{18}$ alkyl and

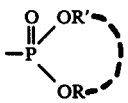

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may combine to form one single radical; and (3) (as an optional component) at least one comonomer copolymerizable with triallyl phosphate and the bis(hydrocarbyl) vinylphosphonate including the vinyl and vinylidene halides, such as vinyl chloride, vinyl bromide, vinylidene chloride, vinylidene bromochloride and vinylidene bromide, the alpha olefins, such as ethylene, propylene and butylene; vinyl esters of carboxylic acids, such as vinyl butyrate and vinyl stearate; $C_1$–$C_{20}$ alkyl esters of acrylic and methacrylic acid, such as methyl methacrylate, methyl acrylate, ethyl acrylate, n-butyl acrylate, sec.-butyl acrylate, tert.-butyl acrylate, 2-ethylhexyl acrylate, lauryl acrylate, and the like; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide and their N-methylol and diacetone derivatives such as N-methylol acrylamide, N-methylol methacrylamide and diacetone acrylamide; vinyl aryl compounds such as styrene and alpha-methyl styrene; $C_1$–$C_{20}$ alkyl vinyl ethers such as methyl vinyl ether, ethyl vinyl ether and stearyl vinyl ether; dienes such as isoprene and butadiene; and glycidyl esters of acrylic and methacrylic acid such as glycidyl acrylate and glycidyl methacrylate. The preferred optional comonomers are the $C_1$–$C_{20}$ alkyl esters of acrylic and methacrylic acid, especially the lower ($C_4$–$C_8$) alkyl acrylates.

The use, in this disclosure, of the expression "hydrocarbyl" and "substituted hydrocarbyl groups" in the definition of the suitable bis(hydrocarbyl)vinylphosphonates given hereinabove refers to the radicals obtained upon the removal of a hydrogen from a hydrocarbon or substituted hydrocarbon group which may be either an aliphatic or aromatic group. These hydrocarbyl groups may be substituted with any non-interfering group, i.e., with any group which does not interfere with the polymerization of the bis(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of the aliphatic and aromatic groups as represented by R and R' in the structure of the bis(hydrocarbyl)vinylphosphonate given hereinabove are alkyl groups, such as methyl, ethyl, propyl, butyl, pentyl, hexyl, nonyl, and the like; alkenyl groups such as pentenyl and hexenyl groups and all of their respective isomers; cycloalkyl groups, such as cyclopropyl, cyclobutyl, cyclopentyl, cyclohexyl and the like; cycloalkenyl groups such as cyclohexenyl and the like; typical aryl groups include phenyl, benzyl, phenethyl, tolyl, naphthyl and the like.

Representative of the above-defined bis(hydrocarbyl) vinylphosphonates are:

Bis(beta-chloroethyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl)vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate From the above group of bis(hydrocarbyl)vinylphosphonate monomers, it is preferred to employ bis(beta-chloroethyl)vinylphosphonate in preparing the novel polymers of this invention since the latter monomer is a commercially available material and lower in cost than any of the other bis(hydrocarbyl)vinylphosphonates.

In addition to the above described bis(hydrocarbyl) vinylphosphonates, it is also possible to prepare aqueous emulsion polymers useful as flame retardant additives by employing: (1) mono (alkyl) acid vinylphosphonates such as, for example, mono (ethyl) hydrogen vinylphosphonate, mono(butyl) hydrogen vinylphosphonate, mono(octyl)hydrogen vinylphosphonate; mono(beta-chloroethyl)hydrogen vinylphosphonate, mono(omega-chlorooctyl) hydrogen vinylphosphonate; (2) mono(cycloalkyl) and mono(aryl) hydrogen vinylphosphonates such as, for example, mono(cyclohexyl) hydrogen vinylphosphonates mono(phenyl)hydrogen vinylphosphonate, mono(benzyl)hydrogen vinylphosphonate; (3) bis(cycloalkyl) and bis(aryl)vinylphosphonates, such as, for example, bis(cyclohexyl) vinylphosphonate and bis(benzyl)vinylphosphonates; and, (4) bis (alkyl), bis(cycloalkyl), and bis(aryl) allylphosphonates, such as, for example, bis(beta-chloroethyl)allylphosphonate, bis(cyclohexyl)allylphosphonate and bis(benzyl)allylphosphonate, as well as mixtures of any two or more of the above described phosphonate monomers.

The allyl group containing compound is of the formula $(CH_2=CHCH_2O)_2P(O)A$, where A is either OR (a phosphate will result) or R (a phosphonate will result) with R being vinyl, allyl, a $C_1-C_{10}$ alkyl group or an aryl group. The compound is preferably triallyl phosphate, i.e., A is OR with R being allyl. Other allyl containing compounds are diallyl methyl phosphate or phosphonate, diallyl chloromethyl phosphate or phosphonate, diallyl phenyl phosphate or phosphonate, diallyl ortho- or para- methyl phosphate or phosphonate, diallyl 2,3-dichloro- or 2,3-dibromopropyl phosphate or phosphonate, and diallyl vinyl phosphate or phosphonate.

The amounts of the components present in the copolymers is from about 2% to 50% by weight, preferably 10% to 50% by weight, of the allyl containing compound, from about 10% to 98% by weight, preferably 30% to 70% by weight, of bis(hydrocarbyl) vinylphosphate, and from about 0% to 60%, preferably 0% to 40%, of the optional comonomer.

The polymers of the present invention can be prepared by means of free radical initiated emulsion polymerization techniques well known to those skilled in the art. In these procedures, the various monomers and catalysts are emulsified, in water, by means of one or more surface-active emulsifiers where upon the polymerization reaction is then initiated. Suitable water soluble, free radical initiating catalysts for use in preparing the copolymer latices of this invention include sodium, potassium and ammonium persulfate and hydrogen peroxide or one may use a redox system such, for example as a mixture of a persulfate with an alkali metal bisulfite, thiosulfate or hydrosulfite. These catalysts should be present in a concentration of from about 0.05 to 5.0%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl polyether alcohols, and the alkyl aryl polyether sulfate salts. The selected emulsifier or emulsifiers should be present in effective concentrations of from about 0.03 to 6.0%, by weight, of the total monomer charge. In addition, a protective colloid such as polyvinyl alcohol, polyvinyl pyrrolidone, methyl cellulose or gelatin can also, if desired, be present in the recipe in an effective concentration of from about 0.03 to 6.0%, by weight, of the total monomer charge. Alternatively, the protective colloid may be introduced into the polymer latex subsequent to its preparation. When post-added in this manner, the protective colloid should be present in a concentration of from about 0.03 to 6.0%, by weight, of the total resin solids. In any event, the presence of the protective colloid serves to enhance the mechanical stability of the emulsion.

The actual polymerization reaction will ordinarily be conducted at a temperature of from about 0° to 100° C. for a period of from about 1 to 24 hours, depending upon such factors as the particular monomer, catalysts, surfactants and polymerization apparatus that is being utilized. The latices resulting from this polymerization process will ordinarily have a resin solids content of from about 5 to 70%, by weight, wherein the particles have a diameter which ranges in size from about 0.03 to 3.0 microns.

If desired, the well known suspension polymerization procedures can be used. In such procedures the selected monomers are present in an aqueous medium which also contains from about 0.05% to 1.0%, by weight of the monomers, of a suspending agent and 0.02 to 1.0% by weight of a monomer-soluble initiator. Examples of suitable suspending agents are methyl cellulose, hydroxyethyl cellulose, hydroxypropyl cellulose, carboxymethyl cellulose, talc, clay, polyvinyl alcohol, gelatin and hydroxypropyl methyl cellulose having a viscosity of about 15,000 cps. at 20° C. Examples of suitable initiators are azobisisobutyronitrile, lauroyl peroxide, benzoyl peroxide and isopropylperoxy dicarbonate. Other examples of suitable suspending agents, initiators and optional ingredients which may be used are well known to persons of skill in the art. The suspension polymerization medium thus formed is then heated to a temperature of about 45° C. to about 85° C. for about 2 to 12 hours with agitation being applied throughout the course of the reaction. The copolymers of the present invention can be incorporated in a polyurethane foam formulation to confer flame retardancy on the foam which results therefrom. Generally from about 20-30 parts per hundred, based on the weight of polyol, will suffice to give the required degree of flame retardancy. The procedures used for forming such foams are well known in the art and are described fully in the following publications which are incorporated herein by reference: Kirk-Othmer Encyclopedia of Chemical Technology, 2nd Edition, Vol. 9, pp. 853–855 and the references cited therein; and Saunders et al., Polyurethanes: Chemistry and Technology, Vols. 1 and 2, New York, N.Y. Foams containing the above-mentioned levels of the copolymers of this invention pass the Motor Vehicle Safety Standard Test (MVSS-302) and have excellent color, density and airflow.

The following Examples further illustrate the invention:

EXAMPLE I

An 80% bis(beta-chloroethyl) vinylphosphonate/20% triallyl phosphate copolymer was formed by placing 80 g. of the vinylphosphonate and 20 g. of triallyl phosphate into a bottle containing 0.5 g. of methyl cellulose suspension agent, 300 g. of water and 0.5 g. of sodium carbonate. Two grams of benzoyl peroxide was dissolved in the mixture. The empty space in the bottle was flushed with a stream of nitrogen, and the bottle was capped and was placed in a metal guard. The bottle was tumbled at 35 r.p.m. in a water bath for 12 hours at 80° C. The polymers obtained were collected by filtration and were washed and dried. The yield was 95 g. of polymer having a phosphorus content of 12.8% and a chlorine content of 22.4%. Methanol extraction resulted in a 6.7% loss of weight.

EXAMPLE II

A 50% bis(beta-chloroethyl)vinylphosphonate/50% triallyl phosphate copolymer was formed by reacting 50 g. of the vinylphosphonate and 50 g. of triallyl phosphate in a bottle containing 2.0 g. benzoyl peroxide, 0.5 g. methyl cellulose and 0.5 g. sodium carbonate in 300 g. water. The bottle was capped after flushing with nitrogen and was placed in a metal guard. The bottle was then tumbled in a water bath for 12 hours at 80° C. The yield was 93 g. The polymer suffered a weight loss of 4.5% when subjected to methanol extraction. It contained 13.3% phosphorus and 15.3% chlorine.

EXAMPLE III

A 70% bis(beta-chloroethyl)vinylphosphonate/30% triallyl phosphate copolymer was formed from 105 g. of the vinylphosphonate and 45 g. of triallyl phosphate. The reaction mixture also contained 3 g. benzoyl peroxide, 0.7 g. methyl cellulose, 450 g. water, and 0.7 g. sodium carbonate. The procedure used in Examples I and II was used with a yield of 141.6 grams being obtained. The composition contained 12.9% phosphorus and 20.9% chlorine.

A 40% vinyl chloride/50% bis(beta-chloroethyl)vinylphosphonate/10% of triallyl phosphate copolymer was formed. Seventy-five grams of the vinylphosphonate, 15 g. of triallyl phosphate, 0.7 g. methyl cellulose, 450 g. of water and 0.5 g. sodium carbonate was frozen in a freezer. To this mixture was added 2.0 g. of isopropyl peroxypivalate and 60 g. vinyl chloride. The reactor bottle was capped and, after being secured in a metal guard, was tumbled in a water bath for 12 hours at 60° C. The resins were collected by filtration and produced a yield of 134.0 g.

EXAMPLE V

The copolymers prepared previously in Examples I–III were tested as a flame retardant additive in the polyurethane foam formulation. The formulation had the following general composition:

| Component | Amount |
|---|---|
| Polyol (CP 3720) | 100 g. |
| L-548 Silicone | 1 g. |
| Water | 28 cc. |
| Dabco 33 LV | 0.28 g. |
| Niax A-1 Catalyst | 0.07 g. |
| Cl$_3$CF | 13.5 g. |
| Dioctyl Phthalate | 1.45 g. |
| Flame Retardant | 15–30 g. |
| Toluene Diisocyanate | 36.5 g. |

The flammability was tested in accordance with Federal Motor Vehicle Safety Standard Test 302.

| % Vinylphosphonate/% Triallyl Phosphate | Additive Level (phr) | Results* |
|---|---|---|
| 80/20 | 30 | SE/NBR |
| 70/30 | 30 | SE/NBR |
| 50/50 | 20 | SE/NBR |
| 50/50 | 15 | SE(4.0 sec) |

*SE = self-extinguishing. This means that the material ignited but did not burn to the timing zone. The time indicates the duration of the burning.
SE/NBR = self-extinguishing/no burn rate. This indicates the material stops burning before it has burned for 60 sec. from the start of timing and has not burned more than 2 inches from the point where timing was started.

EXAMPLE VI

A series of copolymers were made by reacting the various reagents listed in the Table for 10 hours at 70°C. The Table also sets forth the amount of recovered solids:

TABLE

| REAGENT | NO. 1 | 2 | 3 | 4 | 5 | 6 | 7 | 8 |
|---|---|---|---|---|---|---|---|---|
| Bis(beta-chloroethyl) vinylphosphonate | 50 | 50 | 50 | 50 | 50 | 70 | 70 | 70 |
| Triallyl phosphate | 50 | 50 | 50 | 50 | 50 | 30 | 30 | 30 |
| Ammonium persulfate | 2 | 2 | 2 | 2 | 2 | 2 | 2 | 2 |
| Sodium carbonate | 1 | 1 | 1 | 1 | 1 | 1 | 1 | 1 |
| Tetrasodium N-(1,2 dicarboxyethyl)-N-octadecylsulfosuccinamate (5%) | 40 | 40 | — | — | — | 40 | — | — |
| Sodium lauryl sulfate (10%) | — | — | 20 | 20 | — | — | 20 | — |
| Vinol 523 (5%) | — | 20 | — | 20 | — | — | 20 | 20 |
| Bis(tridecyl)ester of sodium sulfosuccinic acid (1%) | — | — | — | — | 200 | — | — | 200 |
| Water | 160 | 140 | 180 | 160 | — | 160 | 160 | — |
| Recovered Solids | 99.3 | 88.1 | 98 | 92.4 | 91.5 | 91.5 | 96.4 | 99 |

NOTE: All weight amounts are in grams.

1. A flame retardant copolymer formed by free radical initiated polymerization techniques of monomers consisting of:
   (1) an allyl group containing compound of the formula (CH$_2$=CHCH$_2$O)$_2$P(O)A, where A is OR, with R being selected from the group consisting of vinyl, allyl, C$_1$–C$_{10}$ allyl and aryl; and
   (2) at least one bis(hydrocarbyl)vinylphosphonate having the structure:

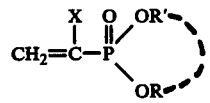

wherein X is selected from the group consisting of hydrogen, halogen, cyano, aryl, C$_1$–C$_{18}$ alkyl and

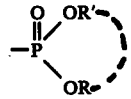

where R and R' are hydrocarbyl and substituted hydrocarbyl groups which can be the same, different or conjoint.

2. A copolymer as claimed in claim 1 wherein the amount of allyl compound is from about 2% to 50% by weight of the copolymer.

3. A copolymer as claimed in claim 1 wherein the amount of bis(hydrocarbyl)vinylphosphonate is from about 10% to 98% by weight of the copolymer.

4. A copolymer as claimed in claim 1 wherein the allyl compound is triallyl phosphate.

5. A copolymer as claimed in claim 1 wherein the bis(hydrocarbyl)vinylphosphonate is bis(beta-chloroethyl)vinylphosphonate.

6. A copolymer as claimed in claim 1 which further consists of up to about 60% of a comonomer selected from the group consisting of the vinyl and vinylidene halides which is copolymerizable with the allyl group containing compound and with the bis(hydrocarbyl)vinylphosphonate.

7. A copolymer as claimed in claim 1 which is formed by emulsion polymerization.

8. A copolymer as claimed in claim 1 which is formed by suspension polymerization.

* * * * *

UNITED STATES PATENT AND TRADEMARK OFFICE
CERTIFICATE OF CORRECTION

PATENT NO. : 4,129,710
DATED : December 12, 1978
INVENTOR(S) : Jung Il Jin

It is certified that error appears in the above-identified patent and that said Letters Patent are hereby corrected as shown below:

Col. 5, -- EXAMPLE IV -- should be inserted as a heading between lines 31 and 32;

Col. 6, -- What is Claimed: -- should be inserted as a heading before Claim 1; and Col. 6, Claim 1, line 7, "$C_1$-$C_{10}$ allyl" should be -- $C_1$-$C_{10}$ alkyl --.

Signed and Sealed this

First Day of May 1979

[SEAL]

Attest:

RUTH C. MASON
Attesting Officer

DONALD W. BANNER
Commissioner of Patents and Trademarks